United States Patent
Hanawa

(10) Patent No.: US 12,253,120 B2
(45) Date of Patent: Mar. 18, 2025

(54) CAM AND ONE-WAY CAM CLUTCH

(71) Applicant: TSUBAKIMOTO CHAIN CO., Osaka (JP)

(72) Inventor: Yuto Hanawa, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/403,338

(22) Filed: Jan. 3, 2024

(65) Prior Publication Data

US 2024/0133433 A1 Apr. 25, 2024
US 2024/0229872 A9 Jul. 11, 2024

Related U.S. Application Data

(63) Continuation of application No. PCT/JP2022/017674, filed on Apr. 13, 2022.

(30) Foreign Application Priority Data

Jul. 5, 2021 (JP) .................. 2021-111619

(51) Int. Cl.
*F16D 41/07* (2006.01)
*F16D 41/06* (2006.01)

(52) U.S. Cl.
CPC ...... *F16D 41/07* (2013.01); *F16D 2041/0603* (2013.01)

(58) Field of Classification Search
CPC .......... F16D 41/07; F16D 2041/0603
USPC ................................. 192/41 A, 45.1
See application file for complete search history.

(56) References Cited

U.S. PATENT DOCUMENTS

| | | | | |
|---|---|---|---|---|
| 3,550,737 A * | 12/1970 | Kent | ............. | F16D 41/07 192/45.1 |
| 4,373,620 A * | 2/1983 | Zlotek | ............. | F16D 41/07 192/41 A |
| 2023/0140002 A1* | 5/2023 | Hanawa | ............. | F16D 41/076 74/337.5 |

FOREIGN PATENT DOCUMENTS

| | | |
|---|---|---|
| JP | 40-24209 B1 | 10/1965 |
| JP | 9-177840 A | 7/1997 |
| JP | 2000-18282 A | 1/2000 |

OTHER PUBLICATIONS

International Search Report dated Jul. 5, 2022, issued in counterpart International Application No. PCT/JP2022/017674. (2 pages).

* cited by examiner

*Primary Examiner* — Richard M Lorence
(74) *Attorney, Agent, or Firm* — WHDA, LLP

(57) ABSTRACT

An object of the present invention is to provide a cam and a one-way cam clutch that realize a reduction in weight and production cost, provide more design freedom in setting the center of gravity of the cam, and achieve high responsiveness. The above object is achieved by a cam configured to make contact with an inner race and an outer race by a rotational moment applied in an engaged direction by an annular spring, in which a plurality of cam plates having an identical outer contour and arranged in parallel along a direction of the pivot axis are coupled together and united by a connecting pin extending in the direction of the pivot axis, and the annular spring is configured to be mountable between adjacent cam plates and/or on an outer side of the plurality of cam plates in the direction of the pivot axis.

4 Claims, 5 Drawing Sheets

Related Art

CAM AND ONE-WAY CAM CLUTCH

TECHNICAL FIELD

The present invention relates to cams set in an annular space between an inner race and an outer race to transmit or interrupt torque between the inner race and the outer race, and a one-way clutch that uses the cams as engagement elements.

BACKGROUND ART

Cams between an input shaft and an output shaft in a one-way clutch engage in one direction and transmit torque but disengage in the other direction, allowing the cam clutch to freewheel. One-way cam clutches are used in many industrial machines because of this feature.

In some types of one-way cam clutches, a plurality of cams (sprags) set in an annular space between an inner race and an outer race are engaged with and separated from the inner race and outer race in accordance with relative movements between the inner race and the outer race to allow transmission and interruption of torque from a drive side to a driven side.

As one type of these one-way cam clutches, there is known one that is configured to apply a rotational moment to the cams in the engaged direction, by using an annular spring fitted in circumferentially extending spring mount grooves of the plurality of cams, each spring mount groove being formed on the inner race engagement surface or outer race engagement surface of each cam (see, for example, Patent Literature 1).

FIG. 11 is a perspective view illustrating one configuration example of a conventional cam.

This cam 230 has a spring mount groove 236 in the outer race engagement surface 233, and is configured to be biased radially inwards by the biasing force of an annular spring.

The spring mount groove 236 is formed by two linear grooves 237 as shown in FIG. 12. The apex 238 between the bottom surfaces of these linear grooves 237 has an obtuse angle. The apex 238 of the spring mount groove 236 is located closer to one side of the cam 230 in the engaged direction relative to the pivot axis of the cam, with the annular spring always in contact with the apex 238.

The spring mount groove 236 is formed using a disc cutter, for example, in the process of cutting a steel material such as a round bar that has been machined to have a predetermined outer contour to a predetermined thickness.

CITATION LIST

Patent Literature

[Patent Literature 1] Japanese Patent Application Publication No. H09-177840

SUMMARY OF INVENTION

Technical Problem

The one-way cam clutch makes use of centrifugal force to minimize energy loss. The center of gravity setting in the cross section of the cam perpendicular to its axis is an important factor from this perspective, and it is necessary to design individual cams to have a specific shape in accordance with a desired performance (application) of the one-way cam clutch.

Conventional cams are made of a single material and therefore the setting of the center of gravity in the cross section of the cam perpendicular to its axis is achieved only through making changes to the material, shape, size, etc., of the cam, which imposed a large limitation on the center of gravity setting.

The structure of the one-way cam clutch described above in which the plurality of cams are bound by an annular spring causes an issue of increased workload of machining because of the need to form the spring mount groove in each of the plurality of cams. The production cost was high because of the necessity to use a dedicated machine to form the spring mount grooves.

The present invention was made in view of the circumstances described above and has an object to provide a cam and a one-way cam clutch that realize a reduction in weight and production cost, provide more design freedom in setting the center of gravity of the cam, and achieve high responsiveness.

Solution to Problem

The present invention solves the problems described above by providing a cam disposed in an annular space between an inner race and an outer race and configured to make contact with the inner race and the outer race by a rotational moment applied in an engaged direction by an annular spring, the cam including a plurality of cam plates having an identical outer contour and arranged in parallel along a direction of a pivot axis of the cam, and a connecting pin extending along the direction of the pivot axis and coupling together the plurality of cam plates, the annular spring being configured to be mountable between adjacent cam plates and/or on an outer side of the plurality of cam plates in the direction of the pivot axis.

The present invention also solves the above problems by providing a one-way cam clutch including: an inner race and an outer race that are coaxial and rotatable relative to each other; a plurality of engagement elements circumferentially arranged in an annular space between the inner race and the outer race; and an annular spring biasing the plurality of engagement elements in an engaged direction relative to the inner race and the outer race, the plurality of engagement elements each being configured as the cam described above, the annular spring being mounted between adjacent cam plates of each of the plurality of engagement elements and/or on an outer side of the plurality of cam plates in the direction of the pivot axis.

Advantageous Effects of Invention

According to the cam of one aspect of the present application, the center of gravity in the cross section perpendicular to the pivot axis of the cam can be adjusted by tailoring the position or size of the connecting pin that couples the adjacent cam plates. This provides more design freedom in setting the center of gravity of the cam and allows flexible adaptation of an outer contour of the cam in accordance with required performance.

Since the space between cam plates can be utilized as the mounting part of the annular spring, there is no need to form a mounting groove for the annular spring during the production process of the cams. The individual cam plates can be punched from a plate material and the pin holes can be formed at the same time. This helps to reduce the workload of machining and improve the productivity, as well as reduce the production cost.

Moreover, the cams have no excess material (unnecessary part) in the part where they support the annular spring so that a weight reduction can be achieved.

The configuration of another aspect can prevent displacement of the plurality of cam plates from their positions relative to each other (misalignment in the orientations of the cam plates), which prevents the individual cam plates from making engagement in different degrees.

According to the configuration of another aspect, the connecting pin doubles as a biasing force receiving part that receives a biasing force from the annular spring. Since there is no need to provide a part that serves as the biasing force receiving part separately from the component for coupling together the cam plates, weight reduction and cost reduction can be achieved. The cam plates need only undergo a simple punching process and thus the workload of machining can be reduced. Productivity can be improved in this respect, too, and the production cost can also be reduced.

According to the configuration of another aspect, the biasing force from the annular spring can be applied correctly to the cams in the engaged direction, which helps to keep the cam orientation in a stable manner.

According to the configuration of another aspect, the biasing means support plate does not contact the inner race and outer race, so that friction loss can be reduced.

The one-way clutch of another aspect, with engagement elements configured as the cam described above, can realize weight reduction and production cost reduction, offer high responsiveness, and achieve a desired torque transmission capacity.

DESCRIPTION OF EMBODIMENTS

Figure 1:
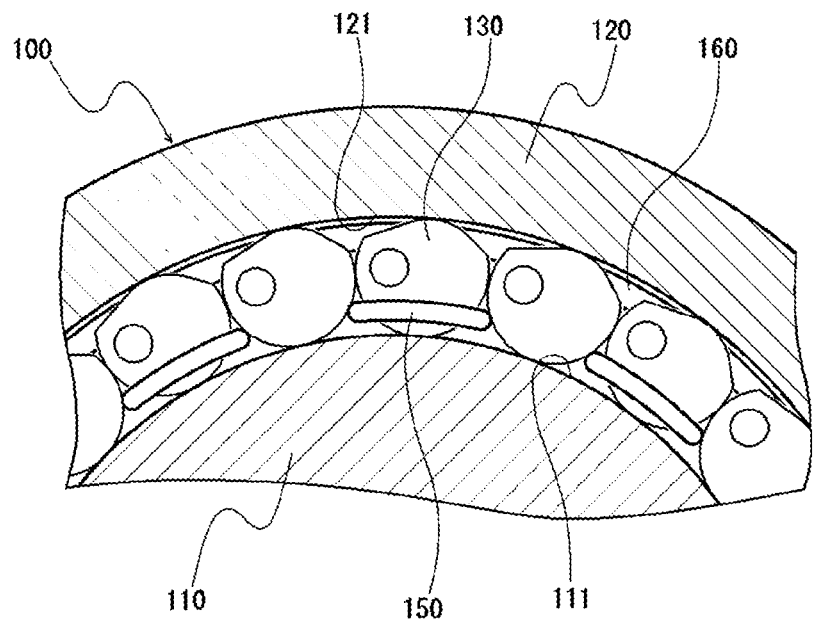
FIG. 1 schematically illustrates the configuration of a part of one example of a one-way cam clutch according to the present invention in cross section perpendicular to the rotation axis.
Figure 2:
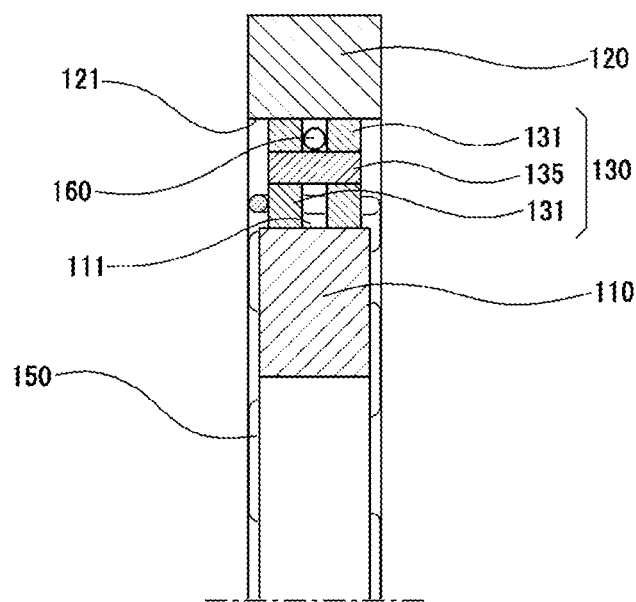
FIG. 2 is a cross-sectional view along the rotation axis of the one-way cam clutch shown in FIG. 1.

As shown in FIG. 1 and FIG. 2, the one-way cam clutch 100 according to the present invention includes: an inner race 110 and an outer race 120 coaxial and rotatable relative to each other; a plurality of circumferentially arranged cams 130 in an annular space between raceways 111 and 121 of the inner race 110 and outer race 120 serving as engagement elements to transmit and interrupt torque between the inner race 110 and outer race 120; a cam cage 150 pivotably holding each of the plurality of cams 130 at predetermined circumferential intervals; and an annular spring 160 biasing each of the plurality of cams 130 in an engaged direction relative to the inner race 110 and the outer race 120.

Figure 3:
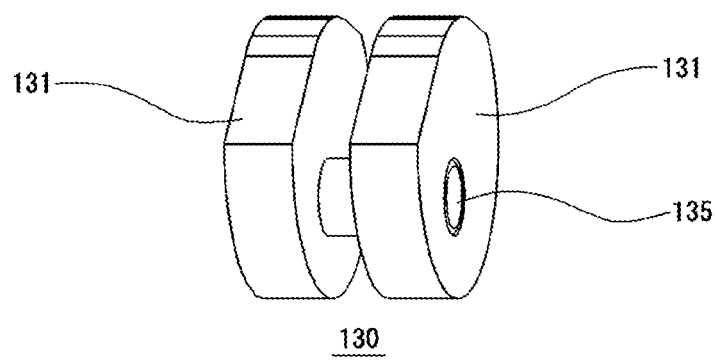
FIG. 3 is a perspective view illustrating a configuration of a cam in the one-way cam clutch shown in FIG. 1.
Figure 4:
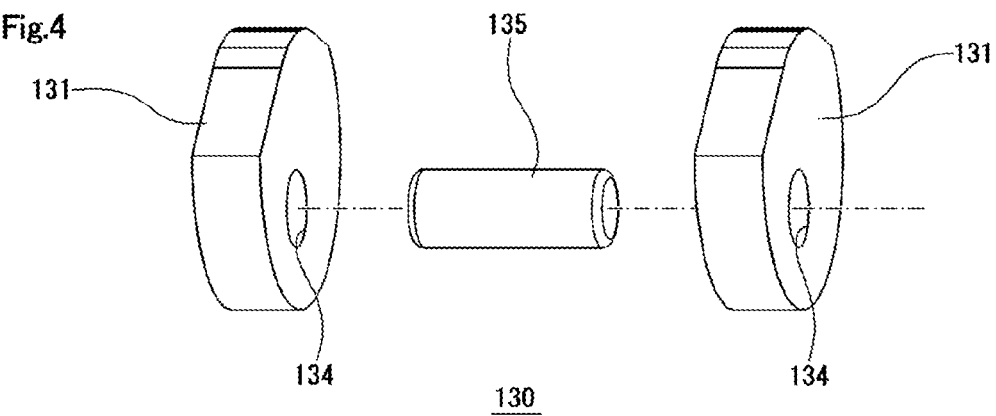
FIG. 4 is an exploded perspective view of the cam shown in FIG. 3.

The plurality of cams 130 are each made up of two cam plates 131 arranged in parallel along the direction of the pivot axis, and a connecting pin 135 extending along the direction of the pivot axis and coupling together the two cam plates 131, as shown in FIG. 3 and FIG. 4. This configuration allows adjustment of the center of gravity in the cross section perpendicular to the pivot axis of the cam 130 through tailoring of the position or size of the connecting pin 135, which provides more design freedom in setting the center of gravity of the cam 130 and allows flexible adaptation of an outer contour of the cam 130 in accordance with required performance.

Figure 5:
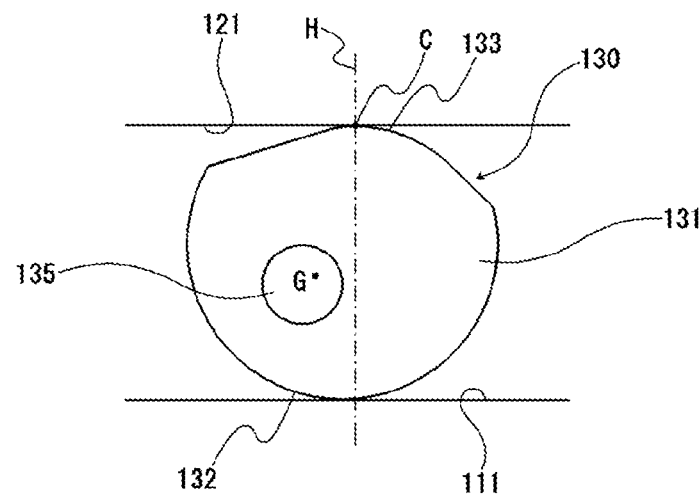
FIG. 5 is a plan view of the cam shown in FIG. 3 viewed from the direction of the pivot axis of the cam.

In this embodiment, the connecting pin 135 is positioned such that the center of gravity G of the cam 130 is located more toward the engaged direction relative to the normal line H at the contact point C between the outer race engagement surface 133 of the cam 130 and the raceway 121 of the outer race 120, as shown in FIG. 5.

The cam plates 131 have the same outer contour. There is therefore no variation in the degree of engagement between the cam plates 131, so that frictional loss can be reduced. This also enables improvement of productivity and reduction of production costs.

As shown in FIG. 5, each cam plate 131 has an inner race engagement surface 132 that makes contact with the raceway 111 of the inner race 110, and an outer race engagement surface 133 that makes contact with the raceway 121 of the outer race 120. The inner race engagement surface 132 has a circular arc cross section, for example, and the outer race engagement surface 133 has a curved cross-sectional shape including a circular arc portion with a smaller radius of curvature than that of the inner race engagement surface 132. For convenience of explanation, FIG. 5 illustrates the raceway 111 of the inner race 110 and the raceway 121 of the outer race 120 as parallel flat surfaces.

A pin hole 134 extends through the cam plates 131 in the thickness direction. The two cam plates 131 are fixedly joined by a connecting pin 135 press-fit into the pin hole 134.

This configuration can prevent displacement of the two cam plates 131 from their positions relative to each other (misalignment in the orientations of the cam plates 131), which prevents the individual cam plates 131 from making engagement in different degrees. The cam plates 131 can be punched from a plate material and the pin holes 134 can be formed at the same time. In this respect, too, the workload of machining can be reduced and productivity can be improved, as well as production costs can be reduced.

This embodiment uses columnar connecting pins 135, for example, and the pin holes 134 have a circular opening with a uniform hole diameter along the thickness direction.

Each cam 130 is configured to allow the annular spring 160 to be fitted between the two cam plates 131. Namely, the cam 130 in this embodiment allows the empty space between cam plates 131 to be used as the mounting part of the annular spring 160, which obviates the need to form a mounting groove for the annular spring during the production process of the cam 130, and therefore the workload of machining can be reduced and productivity can be improved, as well as production costs can be reduced.

The connecting pin 135 of the cam 130 in this embodiment is configured to make contact with the annular spring 160 and receive a biasing force from the annular spring 160. The connecting pin 135 doubles as a biasing force receiving part that receives a biasing force from the annular spring 160. Since there is no need to provide a part that serves as the biasing force receiving part separately from the component for coupling together the cam plates 131, weight reduction and cost reduction can be achieved. Moreover, the cams have no excess material (unnecessary part) in the part where they support the annular spring 160, so that a weight reduction can be achieved.

Figure 6A:
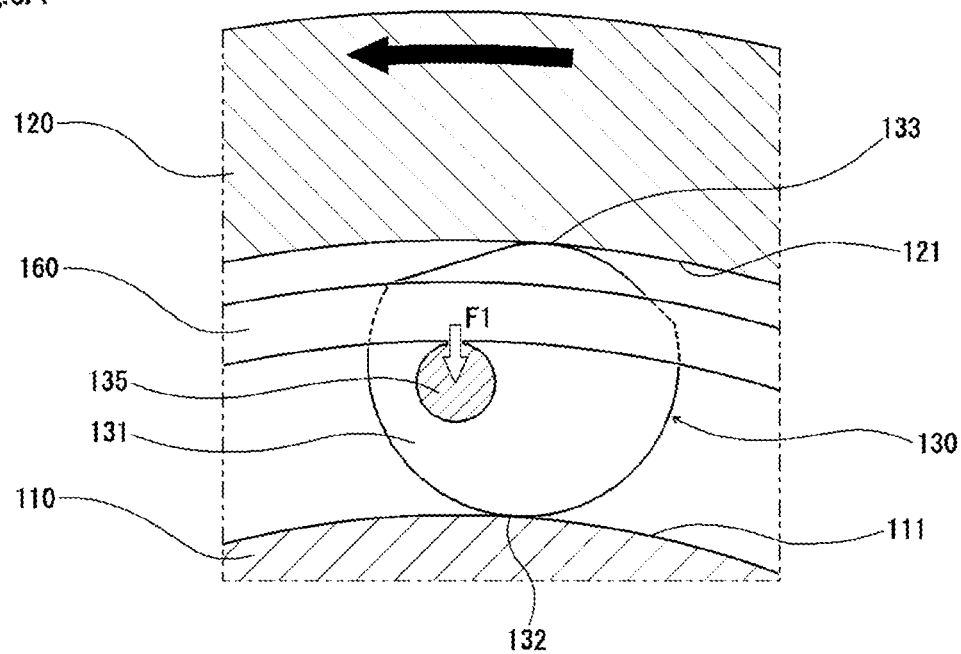
FIG. 6A is a schematic cross-sectional view illustrating a condition (orientation) of the engaged cam in the one-way cam clutch shown in FIG. 1.

The one-way cam clutch 100 in this embodiment uses a ring-like garter spring as one example of the annular spring 160. With the plurality of cams 130 each disposed in the accommodating parts of the cam cage 150, the garter spring is fitted on the outer race engagement surface 133 of each cam 130 so that each of the plurality of cams 130 is biased radially inwards (see FIG. 6A). The garter spring thus binding the plurality of cams 130 stably retains all the cams 130 without variation in their orientation (inclination).

In the one-way cam clutch 100 described above, as shown in FIG. 6A, the inner race engagement surfaces 132 of the cams 130 are in contact with the raceway 111 of the inner race 110 and the outer race engagement surfaces 133 of the cams 130 are in contact with the raceway 121 of the outer race 120 due to the biasing force F1 applied from the annular spring 160. When the outer race 120 is rotated in one direction (counterclockwise in FIG. 6A), the inner race engagement surfaces 132 of the cams 130 make frictional engagement with the raceway 111 of the inner race 110, and the outer race engagement surfaces 133 of the cams 130 make frictional engagement with the raceway 121 of the outer race 120, so that the torque is transmitted between the inner race 110 and the outer race 120.

Figure 6B:
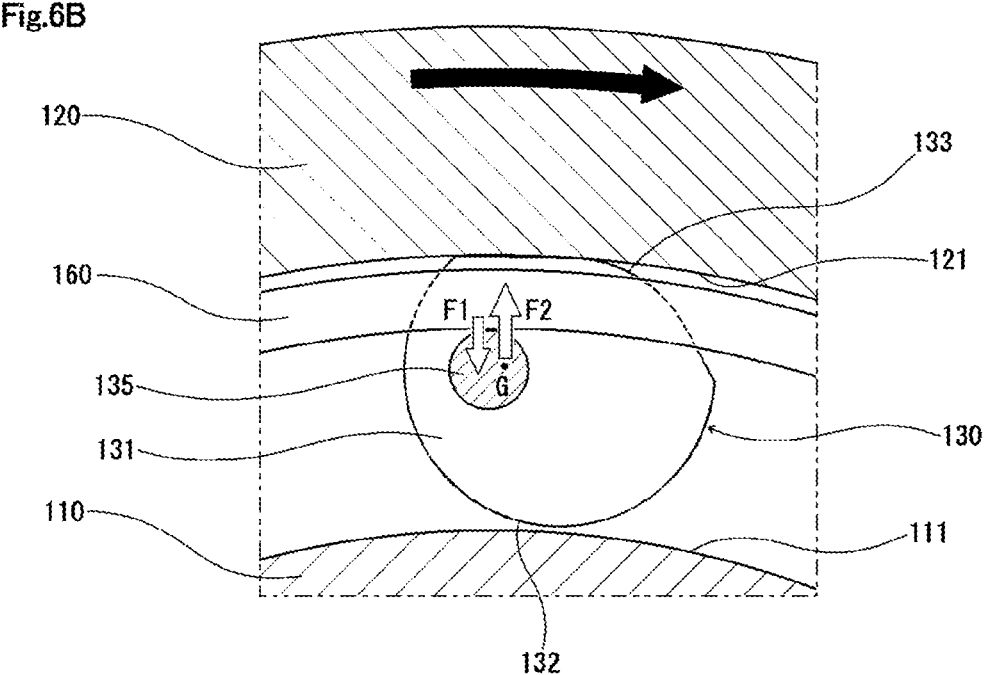
FIG. 6B is a schematic cross-sectional view illustrating a condition (orientation) of the cam in a freewheeling state of the one-way cam clutch shown in FIG. 1.

On the other hand, when the outer race 120 is rotated in the other direction (clockwise in FIG. 6B), the cams 130 rotate against the rotational moment M imparted by the biasing force F1 of the annular spring 160 due to application of a certain centrifugal force F2, i.e., the centrifugal force F2 causes the cams 130 to lift up from the inner race 110, as shown in FIG. 6B. Therefore, the inner race engagement surfaces 132 of the cams 130 separate from the raceway 111 of the inner race 110, and the torque transmission between the inner race 110 and the outer race 120 is interrupted. Wear on the inner race engagement surfaces 132 and outer race engagement surfaces 133 of the cams 130 during high-speed freewheeling can thus be prevented.

Figure 7:
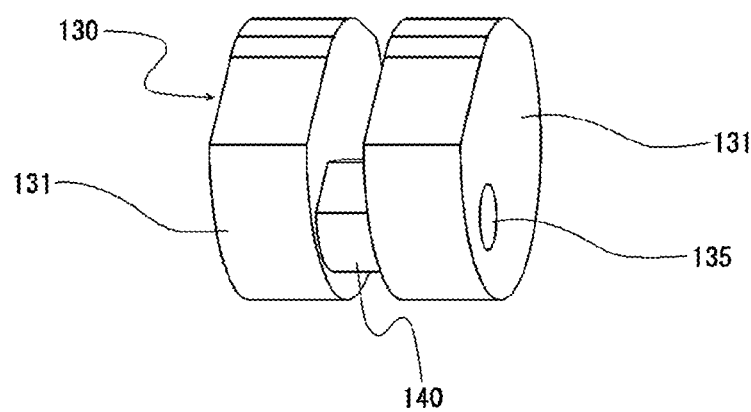
FIG. 7 is a perspective view illustrating another configuration example of the cam according to the present invention.
Figure 8:
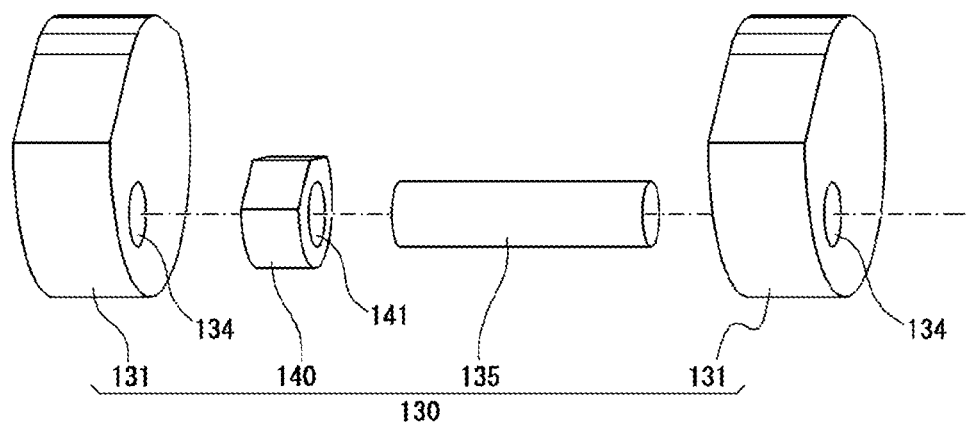
FIG. 8 is an exploded perspective view of the cam shown in FIG. 7.

FIG. 7 and FIG. 8 are diagrams illustrating another configuration example of the cam.

This cam 130 is configured to further include a biasing means support plate 140 designed to make contact with the annular spring and to receive a biasing force from the annular spring. In FIG. 7 and FIG. 8, the same components as those of the cam shown in FIG. 3 to FIG. 5 are given the same reference numerals and description thereof will be omitted.

A pin hole 141 extends through the biasing means support plate 140 in the thickness direction. The connecting pin 135 that couples together the two cam plates 131 is press-fit into the pin hole 141 so that the biasing means support plate 140 is fixedly joined to the two cam plates 131.

Figure 9:
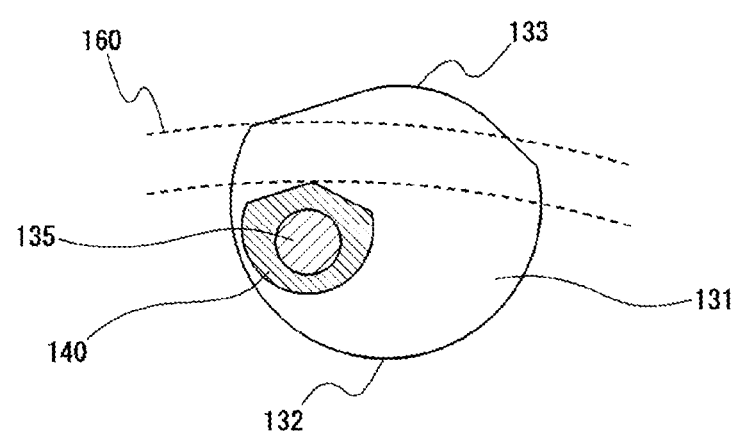
FIG. 9 is a cross-sectional view of the cam shown in FIG. 7 viewed from the direction perpendicular to the pivot axis of the cam.

The biasing means support plate 140 is formed by cutting off parts of a circular plate, for example, along two planes perpendicular to the circular plate and intersecting at an obtuse angle to have a shape in plan view as shown in FIG. 9, the obtuse apex between the two planes forming a biasing force receiving part that receives the biasing force from the annular spring 160.

In this embodiment, the biasing means support plate 140 is arranged between the two cam plates 131, allowing the annular spring to be fitted between the two cam plates 131. The biasing means support plate 140 enables application of a correct biasing force from the annular spring on the cams 130 in the engaged direction.

The biasing means support plate 140 is located inside of the outer peripheral edge of the cam plate 131, and therefore, the biasing means support plate 140 does not contact the inner race 110 and outer race 120, which contributes to a reduction in friction loss.

While one embodiment of the present invention has been described in detail, the present invention is not limited to the embodiment described above and may be carried out with various design changes without departing from the scope of the present invention set forth in the claims.

For example, in the embodiment described above, the annular spring is mounted between the two cam plates. Alternatively, the connecting pin may be provided such as to protrude from an outer end face of the cam plate, and the annular spring may be mounted on an outer side of the cam plates in the direction of the pivot axis of the cam.

Instead of the two cam plates coupled together with one connecting pin, the cam may be configured with cam plates coupled together with two or more connecting pins.

Figure 10:
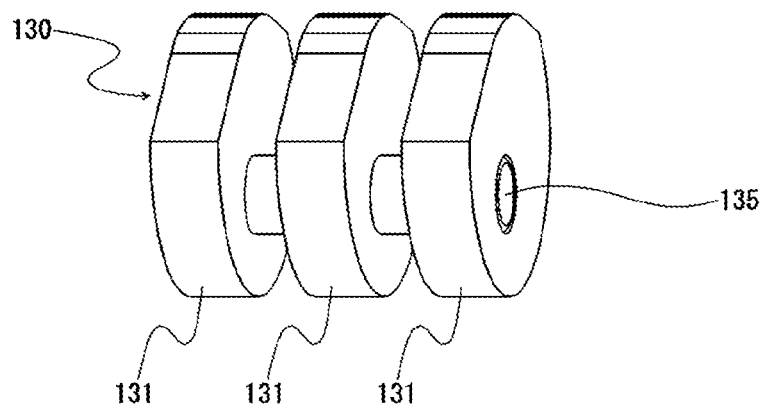
FIG. 10 is a perspective view illustrating yet another configuration example of the cam according to the present invention.
Figure 11:
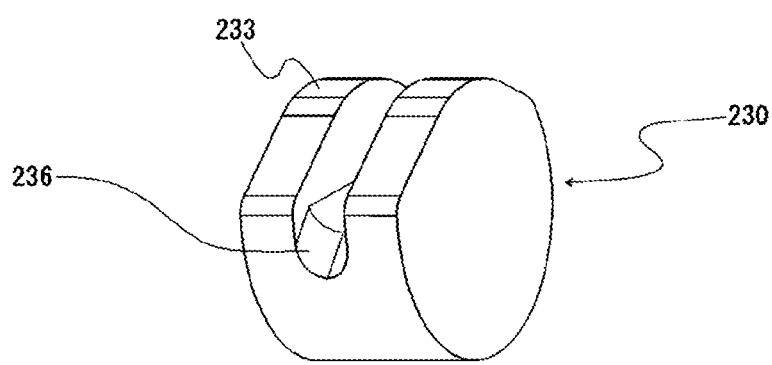
FIG. 11 is a perspective view illustrating one configuration example of a conventional cam.
Figure 12:
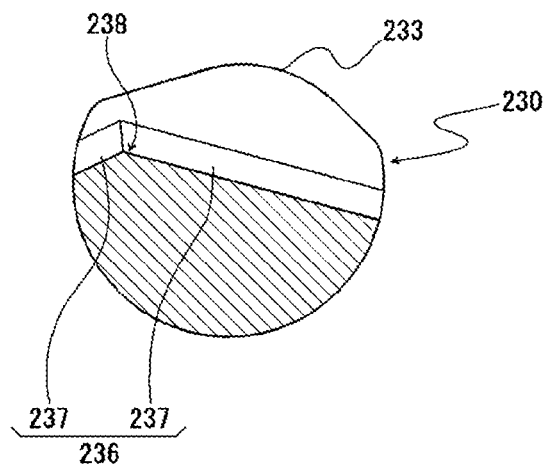
FIG. 12 is a cross-sectional view of the cam shown in FIG. 11 viewed from the direction perpendicular to the pivot axis of the cam.

The number of cam plates is not limited to two and the cam may have three or more cam plates. One configuration example of a cam having three cam plates is shown in FIG. 10. In this cam 130, the space each made between two adjacent cam plates 131 can be used as parts for mounting annular springs, i.e., two annular springs can be mounted. This allows for reliable application of a biasing force suitable for a required function on the cams 130.

In the embodiment described above, the connecting pin has a circular cross section and the pin hole has a circular opening. The cross-sectional shape of the connecting pins and the opening shape of the pin holes are not limited to circular. The pins and holes may have any shape as long as they are easy to produce, such as polygonal, elliptical, and oval, for example. Connecting pins with a polygonal cross section and pin holes with a polygonal opening can reliably provide an anti-rotation function for prohibiting relative rotation of the two cam plates. Columnar connecting pins need not necessarily have a uniform outside diameter along the axial direction and may include parts that vary in outside diameter. Instead of being provided as separate components from the cam plates, the connecting pins may be formed integrally with one of the cam plates.

Further, while the annular spring is mounted such as to bias each of the plurality of cams radially inwards in the embodiment described above, the cam clutch may be configured such that the plurality of cams are each biased radially outwards by the annular spring. The annular spring is not limited to a garter spring and may be any spring as long as it biases each of the plurality of cams in a direction in which the cams engage with the inner race and outer race.

While the cam in the embodiment described above is configured as a disengaging type, the cam may be configured as an engaging type, which is designed to have the center of gravity located such that the cams are engaged by application of a centrifugal force.

Further, the one-way cam clutch of the present invention can be configured without a retainer (cam cage).

REFERENCE SIGNS LIST

100 One-way cam clutch
110 Inner race
111 Raceway
120 Outer race
121 Raceway
130, 230 Cam
131 Cam plate
132 Inner race engagement surface
133, 233 Outer race engagement surface
134 Pin hole
135 Connecting pin
236 Spring mount groove
237 Linear groove
238 Apex
140 Biasing means support plate
141 Pin hole
150 Cam cage
160 Annular spring

The invention claimed is:

1. A cam disposed in an annular space between an inner race and an outer race and configured to make contact with the inner race and the outer race by a rotational moment applied in an engaged direction by an annular spring,
the cam comprising a plurality of cam plates having an identical outer contour and arranged in parallel along a direction of a pivot axis of the cam, and a connecting pin extending along the direction of the pivot axis and coupling together the plurality of cam plates,
the annular spring being configured to be mountable between adjacent the cam plates and/or on an outer side of the plurality of cam plates in the direction of the pivot axis,
the cam further comprising a biasing means support plate integrally fixed to an adjacent cam plate by the connecting pin,
the biasing means support plate being configured to make contact with the annular spring and to receive a biasing force from the annular spring.

2. The cam according to claim 1, wherein the plurality of cam plates are each formed with a pin hole extending through the cam plates in a thickness direction,
the connecting pin being press-fit into the pin hole to fixedly join the plurality of cam plates.

3. The cam according to claim 1, wherein the biasing means support plate is located inside of an outer peripheral edge of the cam plate.

4. A one-way cam clutch comprising:
an inner race and an outer race that are coaxial and rotatable relative to each other;
a plurality of engagement elements circumferentially arranged in an annular space between the inner race and the outer race; and
an annular spring biasing the plurality of engagement elements in an engaged direction relative to the inner race and the outer race,
the plurality of engagement elements each being configured as the cam according to claim 1, the annular spring being mounted between adjacent cam plates of each of the plurality of engagement elements and/or on an outer side of the plurality of cam plates in the direction of the pivot axis.

* * * * *